United States Patent [19]

Kobayashi et al.

[11] Patent Number: 4,563,402
[45] Date of Patent: Jan. 7, 1986

[54] LEAD STORAGE BATTERY WITH IMPROVED BOND BETWEEN THE TERMINAL POLE AND THE COVER

[75] Inventors: Kenji Kobayashi; Yasuhiko Uchida; Tsuyoshi Utsunomiya, all of Kanagawa, Japan

[73] Assignee: Matsushita Electric Industrial Co., Ltd., Osaka, Japan

[21] Appl. No.: 680,339

[22] PCT Filed: Mar. 27, 1984

[86] PCT No.: PCT/JP84/00139
§ 371 Date: Nov. 27, 1984
§ 102(e) Date: Nov. 27, 1984

[87] PCT Pub. No.: WO84/03999
PCT Pub. Date: Oct. 11, 1984

[30] Foreign Application Priority Data

Mar. 28, 1983 [JP] Japan .................................. 58-44491
Mar. 28, 1983 [JP] Japan .................................. 58-44492

[51] Int. Cl.[4] ............................................. H01M 2/30
[52] U.S. Cl. .................................... 429/178; 429/181; 429/185; 429/225; 429/184
[58] Field of Search ................. 429/65, 170, 173, 178, 429/179, 180–185, 171, 172, 174, 225, 175, 176; 339/276 T

[56] References Cited

U.S. PATENT DOCUMENTS 3,808,073 4/1974 Navarre .......................... 429/184 X
4,448,863 5/1984 Terrell ............................ 429/180 X

FOREIGN PATENT DOCUMENTS 54-56729 4/1979 Japan .
54-88640 6/1979 Japan .
57-162253 10/1982 Japan .

Primary Examiner—Anthony Skapars
Attorney, Agent, or Firm—Wenderoth, Lind & Ponack

[57] ABSTRACT

A lead storage battery having a structure by which the terminals, cover and container may be bonded and sealed in a single bonding process using a bonding agent. The storage battery includes a plastic container covered by a plastic cover, battery plates having poles, housed in the container, terminals having first ends contacted to the poles and second ends projecting upward through the terminal, and bonding agent parting embedding the terminals at their first ends and fixing the cover and the container together. The container has a terminal receiving recess formed below and covered by the cover. The terminals have bends inserted in the recess and positioned below the bonding agent so as to define a space in the recess between the bends and the bonding agent so as to prevent overall surface contact therebetween.

6 Claims, 4 Drawing Figures

LEAD STORAGE BATTERY WITH IMPROVED BOND BETWEEN THE TERMINAL POLE AND THE COVER

BACKGROUND OF THE INVENTION

The present invention relates to a lead storage battery and particularly to improvements in a closed type lead storage battery having a plastic container, wherein the construction of the bond between the terminal poles and a cover for the plastic container is improved to provide a leakproof lead storage battery.

In lead storage batteries using dilute sulfuric acid as the electrolyte, leakage of the electrolyte is the most detestable problem as it damages not only the battery itself but also the equipment which uses the battery.

Such a leakage phenomenon takes place mainly (1) between the plastic container and the cover, (2) around the terminal poles of the battery, and (3) between the cells in the case of the monoblock battery. Thus, prevention of this leakage phenomenon has been a long-standing problem in lead storage batteries, but no preventive method has been found which is simple and yet reliable.

A conventional method of bonding the terminal poles to the cover will now be described with reference to the drawings.

As shown in FIG. 1, there is a step of filling a bonding agent 8 into a recess in the back of a cover 5 in which a U-shaped connector 11 connecting cells is embedded, and into an annular recess in an outer peripheral portion bonded to a plastic container 1, and there is a subsequent step of invertedly fitting the plastic container 1 having inserted therein a group of plates 2 over the cover 5 lying with its back side directed upward, and then bonding them together. At this time, a terminal pole 3 is not embedded in the bonding agent 8 but projects outwardly through a pole hole 12 in the cover 5. After going through the step of curing said bonding agent, the battery is brought back to its normal position, as shown in FIG. 2. Then, a rubber packing 13 is fitted on the terminal pole 3 so that a bonding agent 14 for fixing the terminal pole 3 to the cover 5 cannot fall down through the pole hole 12 onto the group of plates 2 on the cell chamber side. The front end of the terminal pole is then soldered to a Faston tab terminal 7. After the step of filling the bonding agent 14 into the recess has been performed, the bonding agent 14 is cured to thereby bond the terminal pole and the cover together.

However, this method of producing batteries requires that the operation of bonding the terminal poles to the cover to be performed in two stages, i.e., on the U-shaped connector portion connecting the cells and on the terminal pole portion; thus, not only is the number of steps excessive but also it takes a long time for the bonding agent to cure. Therefore, there has been a disadvantage that too much time is taken for completion of the battery.

SUMMARY OF THE INVENTION

The present invention is a lead storage battery wherein a terminal connected at one end thereof to a pole of a group of plates housed in a plastic container and projecting at the other end thereof upward through an end of a cover is partly embedded in a bonding agent which fixes said plastic container and said cover together, and defined between a terminal receiving recess formed in said plastic container and a terminal bend inserted in said terminal receiving recess and positioned below said bonding agent is a space which prevents the two from overall surface contact.

According to the invention, at the same time as the plastic container and cover are bonded together, the terminal poles and cover are bonded together, so that the fixing of the terminal poles to the cover can be easily and economically effected and, moreover, the following effects can be attained.

(1) A reduction in the number of steps required for bonding.
(2) A reduction in the time taken for completion of the battery.
(3) A reduction in cost.

BEST MODE OF CARRYING OUT THE INVENTION

Embodiments of the present invention will now be described with reference to the drawings.

Figure 3:
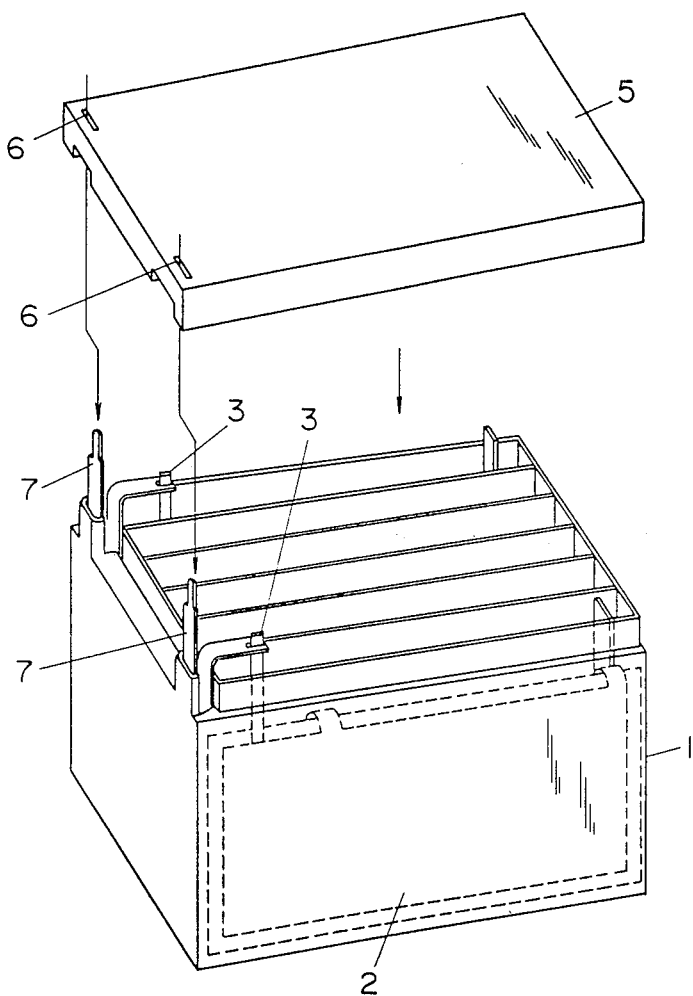
FIG. 3 is an exploded perspective view of the plastic container and cover of a lead storage battery in an embodiment of the present invention.
Figure 4:
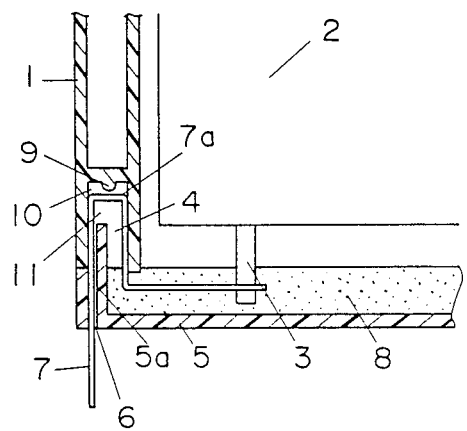
FIG. 4 is a sectional view showing the arrangement of principal portions of the lead storage battery in the embodiment of the invention shown in FIG. 3.

In FIGS. 3 and 4, the numeral 1 denotes a plastic container of ABS resin for a lead storage battery numeral; 2 denotes a group of plates housed in each cell chamber of the plastic container 1 numeral; 3 denotes terminal poles for the plates group 2 numeral; 4 denotes a terminal receiving recess defined by a bottom and two side interior wall surfaces formed in part of the plastic container 1 numeral; 5 denotes a cover of the same material as the plastic container, mounted on said plastic container 1 numeral; 7 denotes Faston tab terminals connected at one of their respective ends to the poles 3 of the plates group 2 and projecting at the other ends upward through throughgoing holes 6 formed in an end of the cover 5, each having a U-shaped bend 7a inserted in the recess 4 of the plastic container 1; and numeral 8 denotes an epoxy type bonding agent injected to the back side of the cover 5 for fixing the plastic container 1, the cover 5 and the terminals 7 together. The numeral 9 denotes a small projection on the bottom surface of the terminal receiving recess 4 for contacting part of the bend 7a of the Faston tab terminal so as to control the terminal 7; and numeral 10 denotes space defined between said terminal receiving recess 4 and the end 7a of said Faston tab terminal 7 to prevent the two from overall surface contact.

Figure 1:
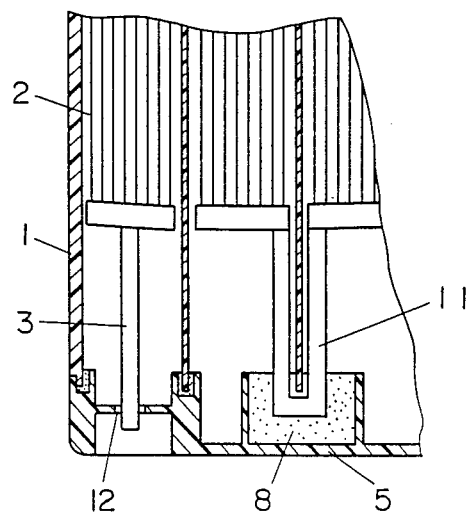
FIG. 1 is a sectional view of an electrolytic cell placed upside down in a conventional method of producing lead storage batteries.
Figure 2:
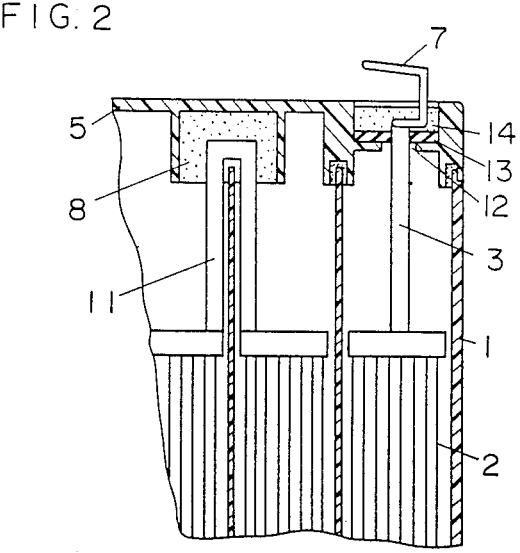
FIG. 2 is a sectional view showing the storage battery in normal position, with the terminal poles and cover fixed together by a bonding agent in accordance with the conventional method.

The fixing of said plastic container 1 and cover 5 is effected by a bonding agent injected into the back side of the cover, this operation being performed by fitting the plastic container 1 having the plates group 2 received in advance in each cell chamber, from above over the cover 5 turned upside down, as shown in FIG. 4, and allowing the assembly to stand at about 60° C. for 2 hours so as to cure the bonding agent. Thereafter, the front end portions of the Faston tab terminals projecting beyond the cover 5 are bent, as shown in FIG. 2.

In the above arrangement, the terminals 7 are led to the outside of the battery which is above the surface of the bonding agent 8, that is, to the terminal receiving recess 4 and then the terminals are led to the lower surface of the cover 5, whereby the U-shaped connector portion and the terminal pole portion can be bonded together in a single operation without leakage of the bonding agent through the throughgoing holes 6. In this connection, although the bonding agent 8 enters the clearance between the Faston tab terminals 7 and the wall surface of the terminal receiving recess 4, its upward movement due to capillary action is interrupted by the space 10 defined by the small projection 9 between the bent 7a of the Faston tab terminal 7 and the terminal receiving recess 4.

On the other hand, the upward capillary movement of the bonding agent 8 along the inner wall 5a of the cover 5 is interrupted by the space 11 provided thereabove. In addition, if the spaces 10 and 11 are dimensioned to be greater than the capillary tube the bonding agent moves upward in, it is prevented from further upward capillary movement.

In the embodiment, since the clearance between the terminal receiving recess 4 and the terminal 7 is 0.1 mm or less, the dimension of the space 10 defined by the small projection 9 between the bottom of the recess 4 and the bond 7a of the terminal is designed to be 1.0 mm, and since the dimension of the clearance between the inner wall 5a and the terminal 7 is 2 mm, the dimension of the space 11 is designed to be 4.0 mm.

INDUSTRIAL APPLICABILITY

As has been described so far, according to the present invention, the terminal poles and plastic container of a lead storage battery can be liquid-tightly bonded together and the battery can be widely used as a power source for battery-using equipment without being restricted in its orientation when the lead storage battery is used.

What is claimed is:

1. A lead storage battery, comprising:
   a plastic container having an open top end;
   a cover covering said open top end;
   a group of battery plates having poles, housed in said plastic container;
   terminals having first ends connected to said poles and second poles projecting upward through said cover; and
   bonding agent partly embedding said terminals at said first ends and fixing said cover and said container together;
   said plastic container having a terminal receiving recess below and covered by said cover, each of said terminals having a bend betwen said first and second ends, inserted in said recess and positioned below said bonding agent so as to define a space in said recess between said bend and said bonding agent so as to prevent overall surface contact therebetween.

2. A lead storage battery as is claim 1, wherein said container has a small projection contacting a portion of said bend so as to control the position of said bend.

3. A lead storage battery as in claim 2, wherein said plastic container has a bottom wall surface and spaced apart side wall surfaces upwardly extending from said bottom surface therein, defining an upwardly opening U-shaped boundary of said recess bounding said bend, said small projection being formed on said bottom surface.

4. A lead storage battery as in claim 1, wherein said bend is in the shape of a U, said U having a base spaced from said bonding agent.

5. A lead storage battery as in claim 4, wherein said plastic container has wall surfaces therein defining an upwardly opening U-shaped boundary of said recess bounding said bend.

6. A lead storage battery as in claim 1, wherein said plastic container has interior wall surfaces defining said recess therebetween.

* * * * *